(12) United States Patent
Farr

(10) Patent No.: US 11,190,115 B1
(45) Date of Patent: Nov. 30, 2021

(54) MOTOR STARTER APPARATUS USING INDEPENDENTLY RACKABLE REDUCED VOLTAGE SOFT STARTER ASSEMBLY

(71) Applicant: Eaton Intelligent Power Limited, Dubin (IE)

(72) Inventor: Thomas A. Farr, Candler, NC (US)

(73) Assignee: Eaton Intelligent Power Limited

( * ) Notice: Subject to any disclaimer, the term of this patent is extended or adjusted under 35 U.S.C. 154(b) by 23 days.

(21) Appl. No.: 16/866,855

(22) Filed: May 5, 2020

(51) Int. Cl.
*H02P 1/16* (2006.01)

(52) U.S. Cl.
CPC ..................... *H02P 1/16* (2013.01)

(58) Field of Classification Search
CPC ...... H02P 1/00; H02P 1/04; H02P 1/10; H02P 1/12; H02P 1/16; H02P 1/24; H02P 1/26; H02P 1/265; H02P 1/28; H02P 1/32; H02P 1/42; H02P 1/46; H02P 1/50; H02P 3/00; H02P 3/06; H02P 6/00; H02P 6/06; H02P 6/32; H02P 7/00; H02P 8/00; H02P 8/04; H02P 9/00; H02P 11/00; H02P 21/00; H02P 21/22; H02P 21/0021; H02P 21/34; H02P 23/00; H02P 27/00; H02P 27/04; H02P 27/06
See application file for complete search history.

(56) References Cited

U.S. PATENT DOCUMENTS

| | | | | |
|---|---|---|---|---|
| 10,247,162 | B2 * | 4/2019 | Forster | F02N 11/14 |
| 10,541,536 | B2 * | 1/2020 | Rowden | H02P 9/307 |
| 2010/0032275 | A1 * | 2/2010 | Meier | H01H 9/548 |
| | | | | 200/502 |
| 2013/0285592 | A1 * | 10/2013 | Johnson | H02P 1/28 |
| | | | | 318/778 |
| 2016/0173008 | A1 * | 6/2016 | Waltuch | H02P 6/20 |
| | | | | 318/484 |
| 2017/0033720 | A1 * | 2/2017 | Zeyn | H02P 25/184 |

\* cited by examiner

*Primary Examiner* — Antony M Paul
(74) *Attorney, Agent, or Firm* — Stanek Lemon Crouse & Meeks, P.A.

(57) ABSTRACT

A motor starter apparatus includes an enclosure, a bypass contactor configured to be installed in the enclosure and configured to selectively couple a power source to a motor, and a reduced voltage soft starter (RVSS) circuit assembly (e.g. a wheeled truck) configured to be installed in the enclosure, to be coupled to the power source and to apply a variable voltage to the motor. The bypass contactor is configured to preserve a connection of the bypass contactor to the power source and the motor when the RVSS circuit assembly is removed from the enclosure.

17 Claims, 7 Drawing Sheets

MOTOR STARTER APPARATUS USING INDEPENDENTLY RACKABLE REDUCED VOLTAGE SOFT STARTER ASSEMBLY

BACKGROUND

The inventive subject matter relates to electrical power apparatus and methods and, more particularly, to motor starters and methods of operating the same.

Starting of a motor may require multiple times the motor's rated current, and a full-voltage start of a motor can hit the motor with a transient torque that may exceed the motor's rated torque by a significant amount. This torque can stress the motor and other drive train components (e.g., shafts, bearings, couplings, etc.) attached thereto, thus potentially reducing the lives of the motor and these other drive train components.

Reduced-voltage soft start (RVSSs) motor starter apparatus are commonly used to control torque and reduce starting current for starting a motor by gradually ramping up the voltage applied to the motor. Such soft starter apparatus can help reduce or eliminate potentially damaging phenomena associated with full-voltage starting and thus potentially extending the lives of these components. They can also be used to gradually stop the motor to similarly reduce or prevent damage or undue wear and tear.

A conventional RVSS motor starter may include a RVSS circuit connected between the motor and an AC power line that uses silicon-controlled rectifiers (SCRs) coupled between the line and the motor to gradually increase the voltage to the motor. A bypass contactor is typically used to bypass the RVSS circuit as the motor approaches full-voltage operation.

A potential problem with such motor starters is that selected circuitry within the apparatus, such as the RVVS's SCR-based circuitry, may fail, necessitating replacement. Many conventional motor starters are built in a manner that requires that repair be conducted within the enclosure of the unit, which can incapacitate the entire unit until the repair is completed. However, some motor starters, such as the Eaton MV801 and MV811, may use removable modular assemblies, such as rackable trucks that may be rolled out of the main enclosure for service away from the installation site, thus potentially allowing the unit to continue in operation in a reduced-feature mode.

It may be desirable, however, that the motor being driven remain in operation while failed components, such as the RVSS circuitry, are removed for repair. In some units, this may be achieved by manually bypassing the SCR-based RVSS circuitry and running the motor directly from the AC power line. However, in some conventional units, such as the Eaton Ampgard MV4S, the bypass contactor may be integrated with the RVSS circuitry in a single modular assembly (e.g., a single rackable truck). Continued operation of the motor with this assembly removed may require rewiring in the main enclosure such that the unit may support continued operation of the motor while the assembly is removed.

SUMMARY

According to some embodiments, a motor starter apparatus includes an enclosure, a bypass contactor configured to be installed in the enclosure and configured to selectively couple a power source to a motor, and a reduced voltage soft starter (RVSS) circuit assembly configured to be installed in the enclosure, to be coupled to the power source and to apply a variable voltage to the motor. The bypass contactor is configured to preserve a connection of the bypass contactor to the power source and the motor when the RVSS circuit assembly is removed from the enclosure.

In some embodiments, the RVSS circuit assembly may include a rackable truck configured to be removably installed in the enclosure and an RVSS circuit mounted on the truck. The truck may be configured to be rolled into a compartment of the enclosure and may include at least one electrical contact stab configured to engage at least one bus positioned in the enclosure when the truck is racked in the enclosure.

In further embodiments, the rackable truck may include a first rackable truck and the apparatus may further include a second rackable truck configured to be removably installed in the enclosure and including the bypass contactor. The first and second rackable trucks may be configured to be rolled into at least one compartment of the enclosure and may each include at least one electrical contact stab configured to electrically connect to at least one bus positioned in the enclosure when the first and second trucks are racked in the enclosure. The apparatus may further include a third rackable truck configured to be removably installed in the enclosure and including an input contactor configured to selectively couple the power source to the bypass contactor and the RVSS circuit when the first, second and third trucks are racked in the enclosure.

Some embodiments provide a motor starter apparatus including an enclosure, a first rackable assembly comprising a bypass contactor and configured to selectively connect a power source to a motor when the first rackable assembly is racked in the enclosure and a second rackable assembly comprising an RVSS circuit configured to be coupled to the power source and to apply a variable voltage to the motor when the second rackable assembly is racked in the enclosure. A connection of the bypass contactor to the power source and the motor when the first rackable assembly is racked may be maintained when the second rackable assembly is removed from the enclosure.

The first and second rackable assemblies may include respective first and second wheeled trucks and each of the first and second rackable assemblies may include at least one electrical contact stab configured to electrically connect to at least one bus positioned in the enclosure. The apparatus may further include a third rackable assembly comprising an input contactor configured to selectively couple the power source to the bypass contactor and the RVSS circuit when the first, second and third rackable assemblies are racked in the enclosure.

Still further embodiments provide methods of operating a motor starter apparatus including an enclosure housing a bypass contactor configured to selectively couple a power source to a motor and an RVSS circuit assembly configured to generate and apply a variable voltage to the motor from the power source. The methods include removing the RVSS circuit assembly from the enclosure while preserving connection of the bypass contactor to the power source and the motor and providing power to the motor via the bypass contactor. Removing the RVSS circuit assembly may include rolling out a wheeled truck from the enclosure while leaving the bypass contactor installed.

DETAILED DESCRIPTION

Figure 1:
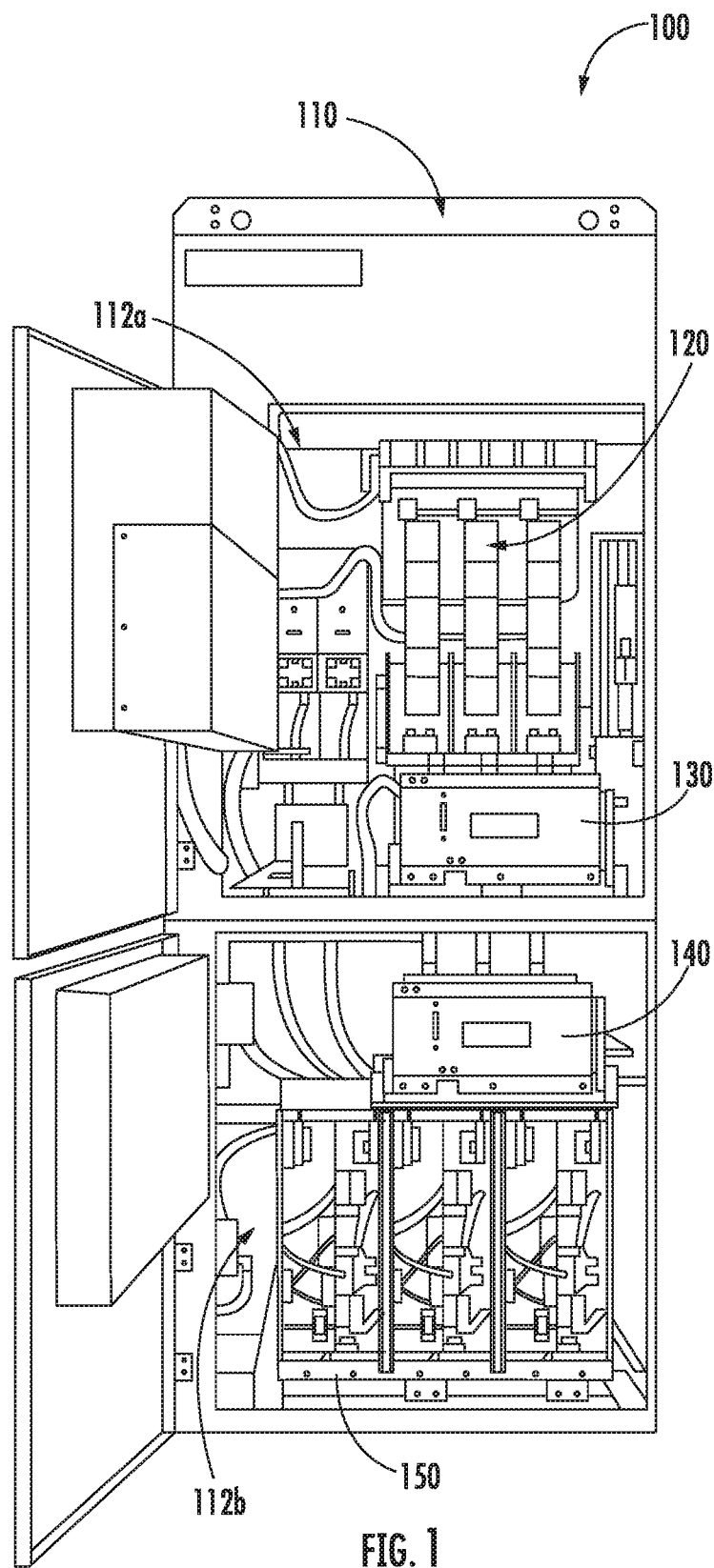
FIG. 1 is a front view of an RVSS apparatus according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved utility in motor starter apparatus may be achieved by providing an RVSS assembly, such as a rackable truck, that is independent of the bypass contactor used to bypass the RVSS. For example, in some embodiments, the RVSS circuitry and the bypass contactor circuitry may be provided on separate rackable trucks or other assemblies that use connectors and an interconnecting bus arrangement that enable the bypass contactor to maintain electrical connections that allow it to continue to convey power to the motor when the RVSS assembly is removed for maintenance or repair.

Figure 2:
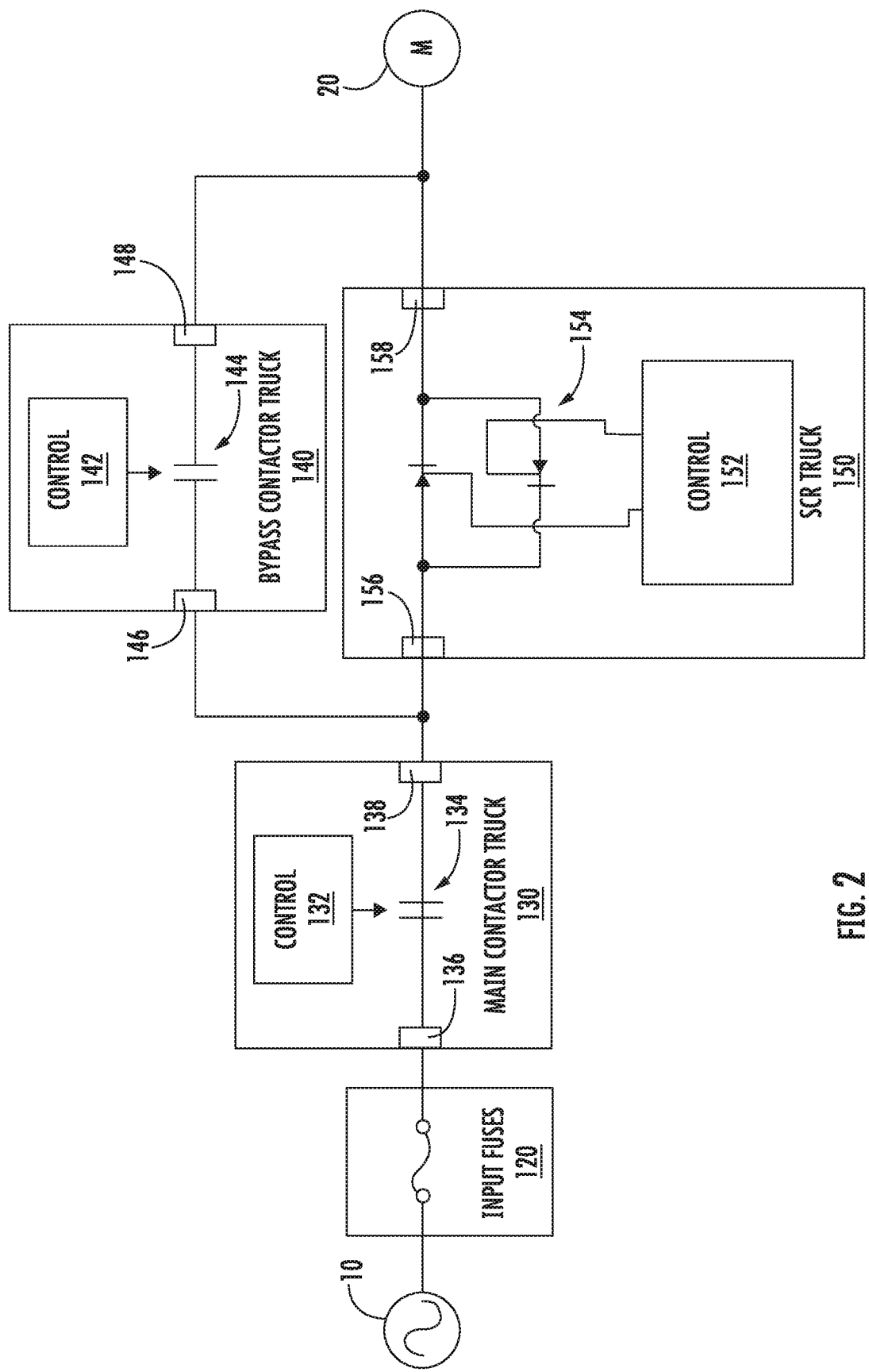
FIG. 2 is a schematic diagram of circuitry of the apparatus of FIG. 1.

Referring to FIGS. 1 and 2, a motor starter apparatus 100 according to some embodiments includes an enclosure 110 having upper and lower compartments 112a, 112b. The upper compartment 112a houses an input fuse assembly 120 and a rackable main contactor truck 130. The lower compartment houses a rackable bypass contactor truck 140 and a rackable RVSS truck 150.

The main contactor truck 130 includes a main contactor 134 that is configured to receive power from a power source 10 via the input fuse assembly 120. The main contactor truck 130 includes a control circuit 132, which may include a variety of different analog and/or digital circuitry, such as driver circuitry for actuating the main contactor 134. The main contactor truck 130 is a wheeled assembly configured to be rolled into the upper compartment 112a, such that electrical contact stabs at the rear of the main contactor truck 130 engage bus bars towards the rear of the upper compartment 112a and thus provide electrical connections within the apparatus 100. However, it will be appreciated that the main contactor 134 and control circuitry 130 may be implemented in other forms, for example, as components fixedly installed in the enclosure 110, rather than as components of a rackable assembly as illustrated.

The RVSS truck 150 includes a silicon-controlled rectifier (SCR) circuit 154 that is electrically connected to the main contactor 134 and used to apply a variable voltage to a motor 20 such that the motor can be gradually accelerated to a desired operating speed. The SCR circuit 154 includes multiple sets (one per phase) of antiparallel connected SCRs that are controlled by a control circuit 152, which may include drivers and other circuitry for controlling the SCRs. As shown, the RVSS truck 150 is also a wheeled assembly having rear contact stabs that engage bus bars towards the rear of the compartment 112b, as further explained below with reference to FIG. 3. However, it will be appreciated that other embodiments may use other types of rackable structures, such as assemblies that are slide into the enclosure 110 on rails without the use of wheels.

The bypass contactor truck 140 includes a bypass contactor 144 that is configured to bypass the SCR circuit 154 of the RVSS truck 150, such that the output of the main contactor 134 may be directly connected to the motor 20. In particular, the bypass contactor 144 may be used to transfer power directly from the power source 10 to the motor 20, after the SCR circuit 154 has been used to softly start the motor 20 by gradually increasing the voltage applied to the motor 20. The bypass contactor truck 140 includes a control circuit 142 for controlling the bypass contactor 144. Similar to the main contactor truck 130, the bypass contactor truck 140 is a wheeled assembly configured to be rolled into the upper compartment 112a, such that electrical contact stabs at the rear of the bypass contactor truck 140 engage bus bars towards the rear of the compartment 112b. However, as with the main contactor 134, it will be appreciated that the bypass contactor 144 and its control circuitry 140 may be implemented in other forms, for example, as components fixedly installed in the enclosure 110, rather than as components of a rackable assembly as illustrated.

The illustrated arrangement can facilitate continued operation of the motor 20 when the RVSS truck 150 is removed, such as when the SCR circuit 154 or other components of the RVSS truck 150 fail and the RVSS truck 150 is removed for repair or replacement. As shown, the main contactor truck 130, the bypass contactor truck 140 and the RVSS truck 150 have connectors 136, 146, 156 that provide electrical connections to at least one first bus 135 (e.g., one bus or multiple buses interconnected by coupling components, such as connectors, additional contactors or other switches, fuses or the like) that is used to electrically interconnect the main contactor truck 120, the bypass contactor truck 140 and the RVSS truck 150. Similarly, the bypass contactor truck 140 and the RVSS truck 150 have connectors 148, 158 that provide electrical connections to at least one second bus 137 (e.g., one bus or multiple buses interconnected by coupling components, such as connectors, additional contactors or other switches, fuses or the like) that is electrically connected to the motor 20. Thus, when the RVSS truck 150 is removed, connection between the main contactor truck 130 and the motor 20 via the bypass contactor 144 may be preserved, allowing the motor 20 to be directly operated from the power source 10.

Figure 3:
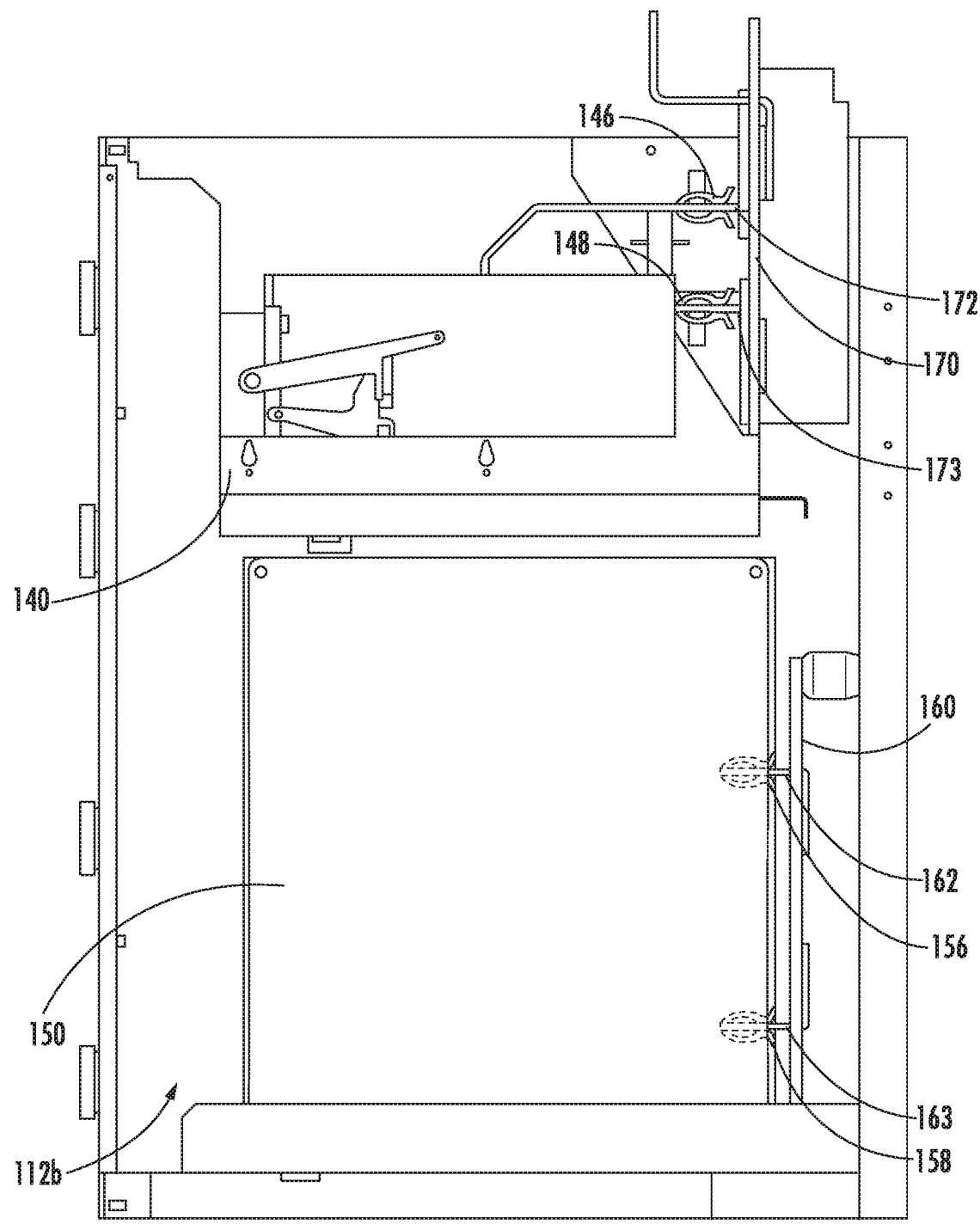
FIG. 3 is a front cutaway perspective view of the RVSS apparatus of FIG. 1 illustrating a bypass contactor truck and an RVSS switching circuit truck racked therein.

FIG. 3, which is a detailed side view of the lower compartment 112b of the motor apparatus 100, illustrate a connector arrangement of the bypass contactor truck 140 and the RVSS truck 150. When the bypass contactor truck 140 is in the racked (installed) position, spring-loaded electrical connection stabs 146, 148 of the bypass contactor truck 140 engage extension members 172, 173 to provide connections as illustrated in FIG. 2. Similarly, the RVSS truck 150 has electrical connection stabs 156, 158 that engage bus bar extensions 161, 163 when the RVSS truck 150 is racked. When, for example, the RVSS truck 150 is removed, this connection arrangement enables the bypass contactor 140 to continue to provide power to the motor 20 from the power source 10. Similarly, if the bypass contactor truck 140 is removed, the SCR circuit 154 of the RVSS truck 150 could still be used to provide power to the motor 20.

Figure 4:
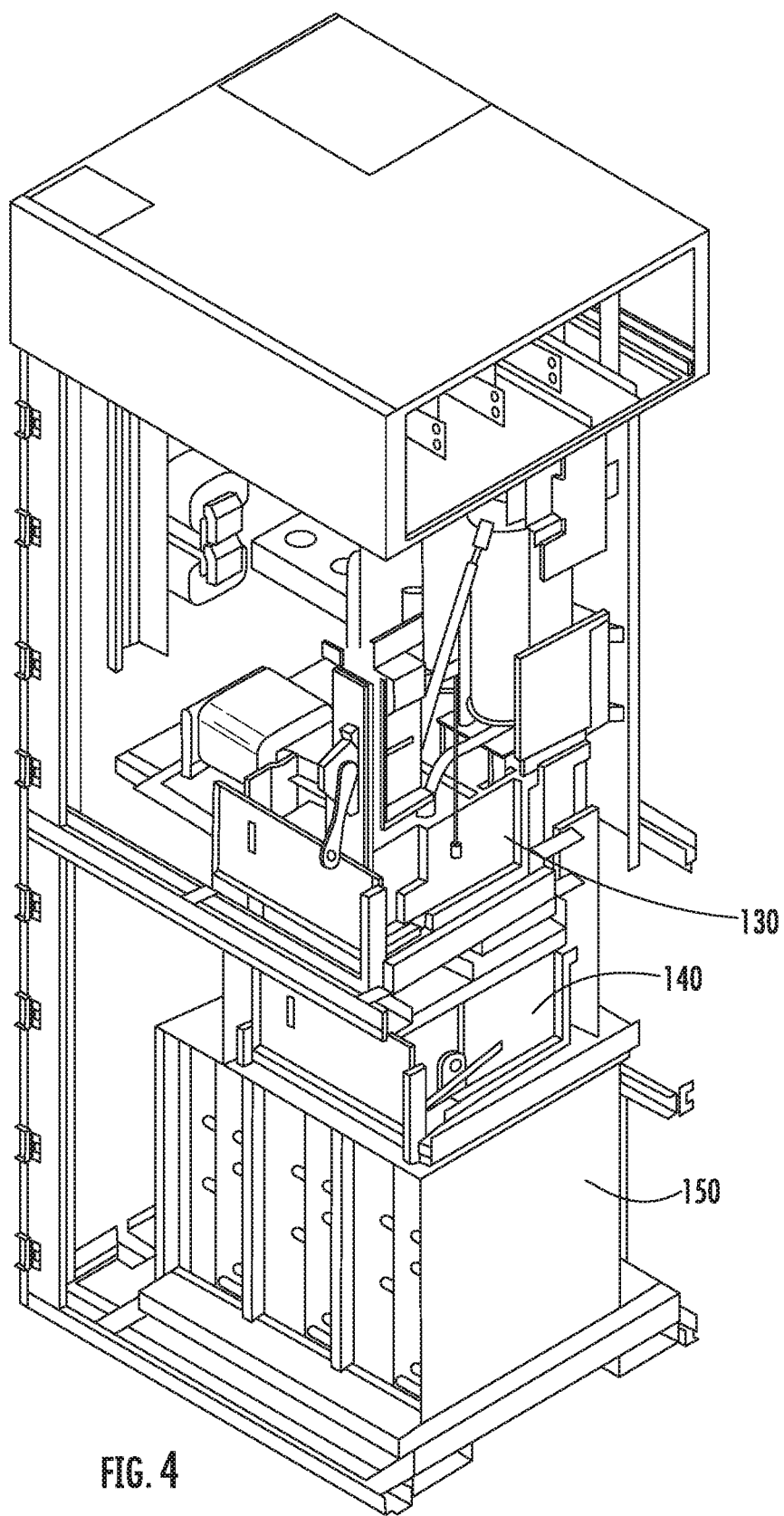
FIG. 4 is a rear cutaway perspective view of the RVSS apparatus of FIG. 1.
Figure 5:
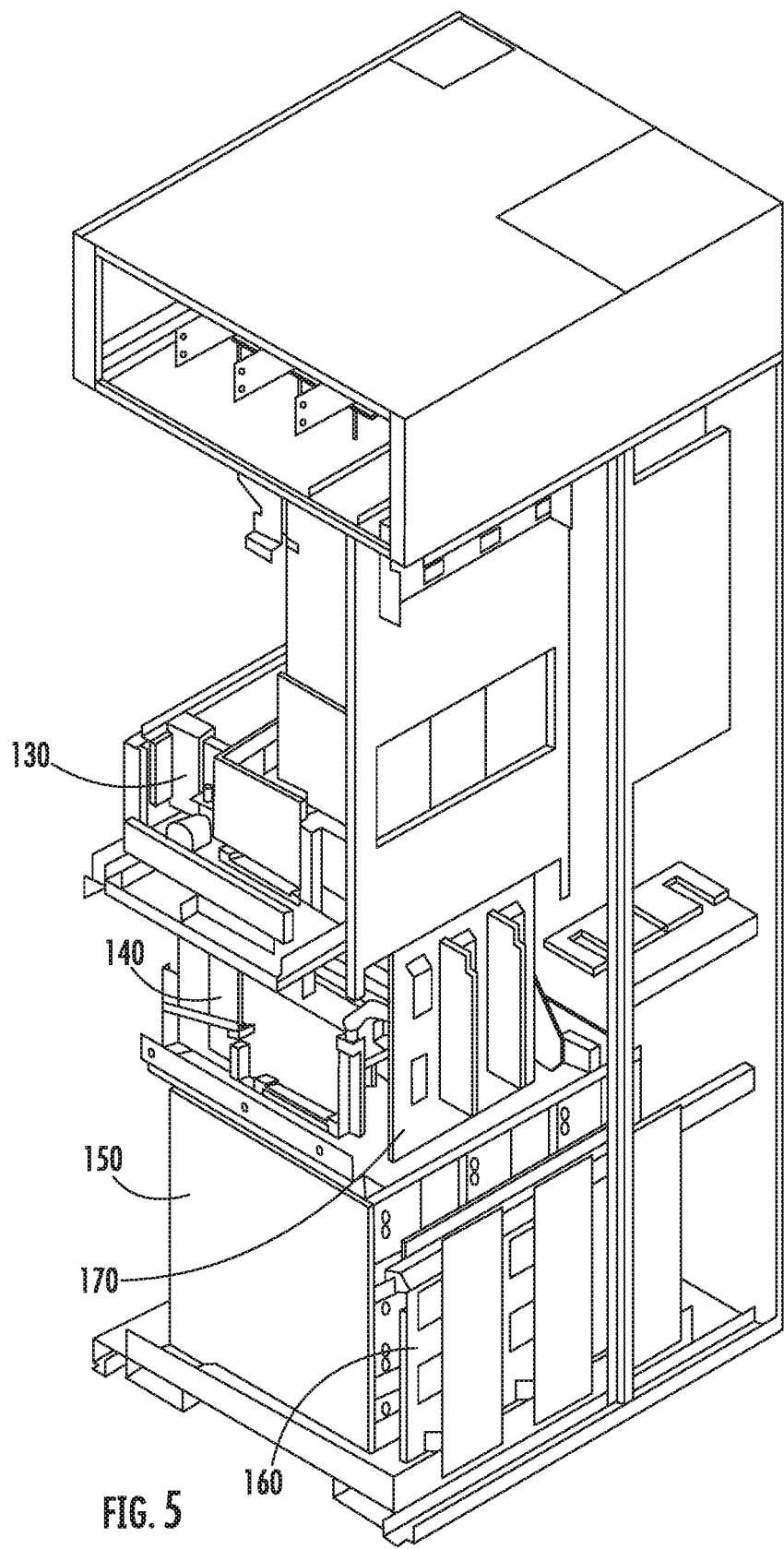
FIG. 5 is side cutaway view of the RVSS apparatus of FIG. 1 with the bypass contactor truck removed.
Figure 6:
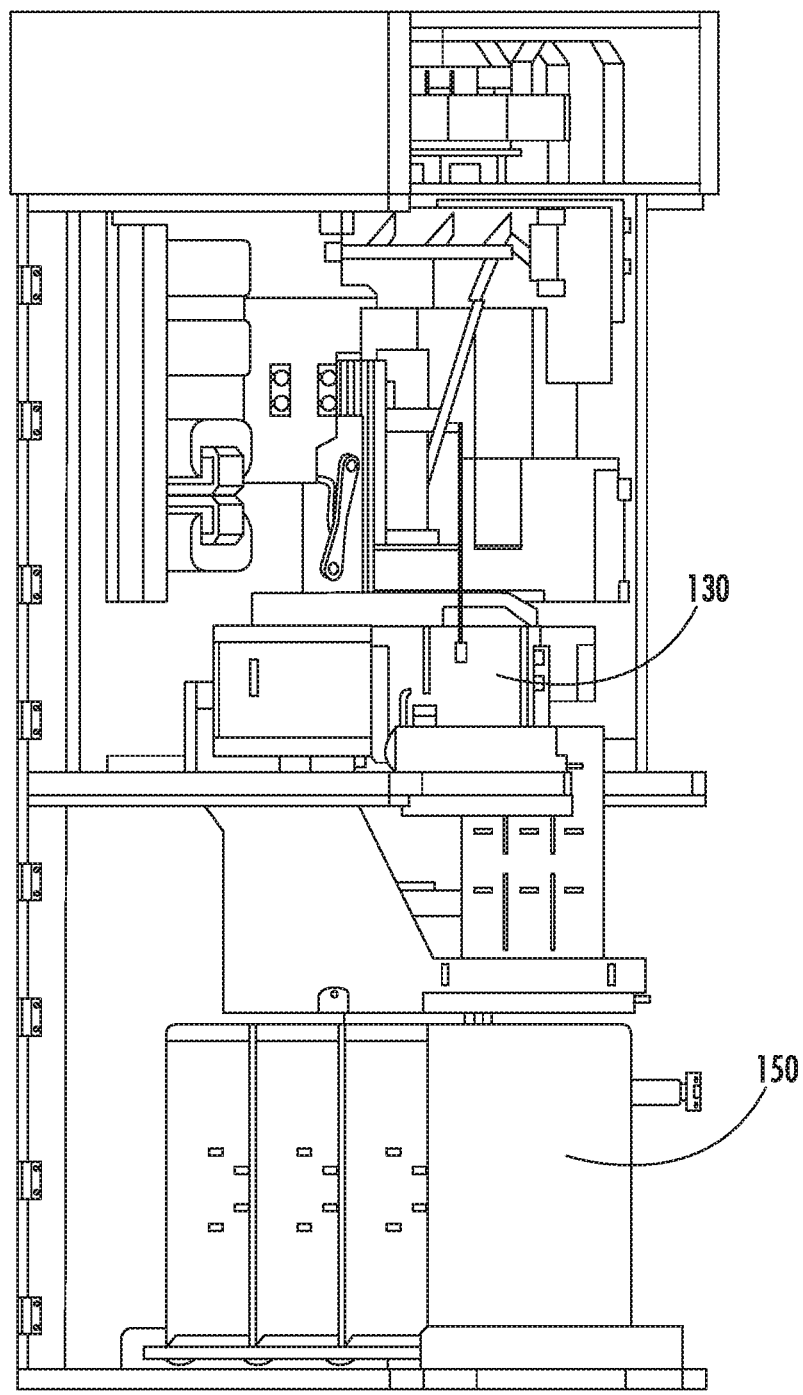
FIG. 6 is a detailed cutaway side view illustrating arrangements and bus connections of the bypass contactor truck and the RVSS switching circuit truck.
Figure 7:
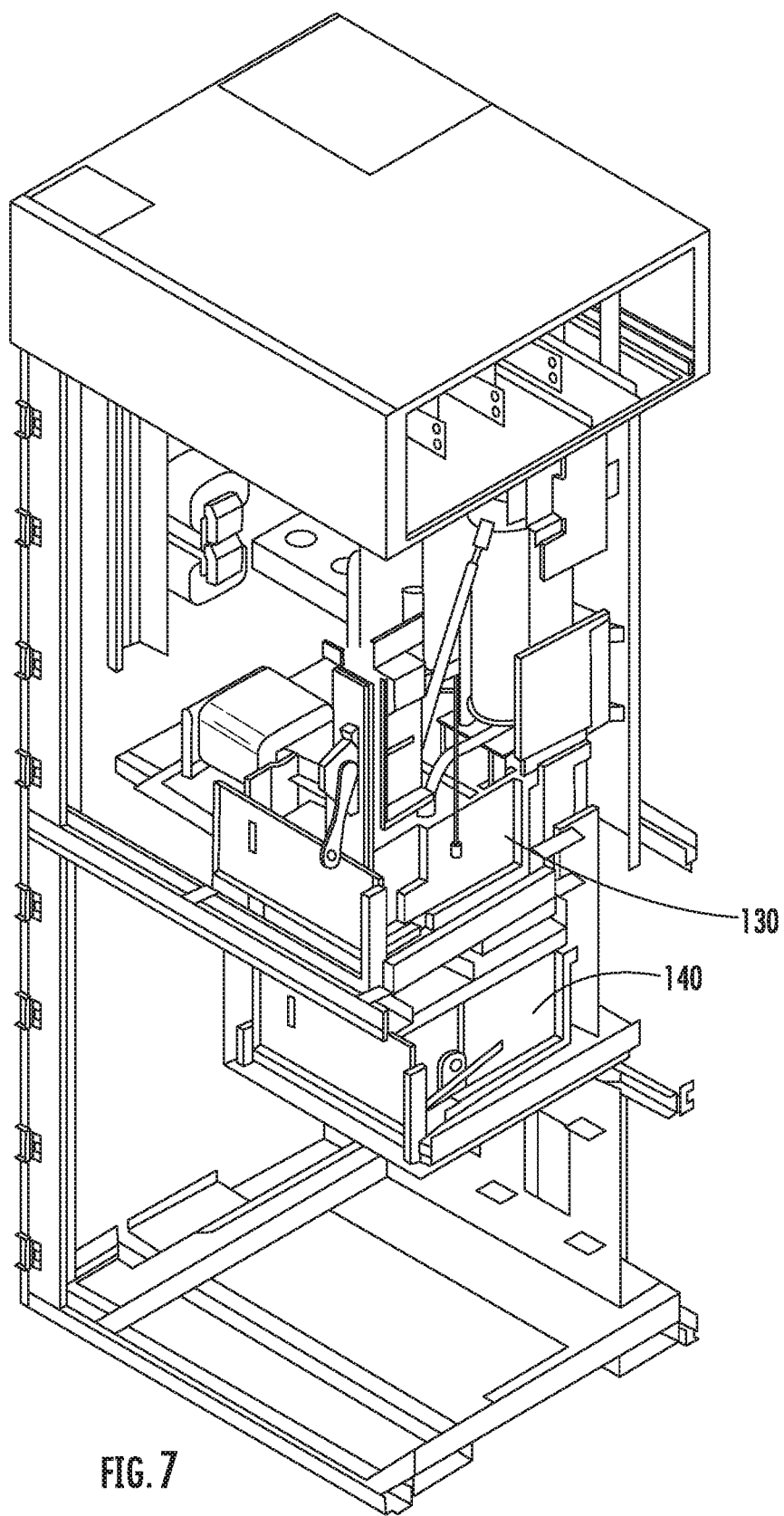
FIG. 7 is a front cutaway perspective view of the RVSS apparatus of FIG. 1 with the RVSS switching circuit truck removed.

FIGS. 4-7 provide various views of the motor starter apparatus 100, illustrating the arrangement of the main contactor truck 130, the bypass contactor truck 140 and the RVSS truck 150. In particular, FIGS. 4 and 5 are cutaway front and rear perspective views, respectively, showing the apparatus 100 with the main contactor truck 130, the bypass contactor truck 140 and the RVSS truck 150 in their racked positions. FIG. 6 is a cutaway side view illustrating the motor drive apparatus 100 with the bypass contactor truck 140 removed, while FIG. 7 is a front perspective view of the motor drive apparatus 100 with the RVSS truck 150 removed.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A motor starter apparatus comprising:
an enclosure;
a bypass contactor configured to be installed in the enclosure and configured to selectively couple a power source to a motor; and
a reduced voltage soft starter (RVSS) circuit assembly configured to be installed in the enclosure, to be coupled to the power source and to apply a variable voltage to the motor;
wherein the bypass contactor is configured to preserve a connection of the bypass contactor to the power source and the motor when the RVSS circuit assembly is removed from the enclosure.

2. The apparatus of claim 1, wherein the RVSS circuit assembly comprises a rackable truck configured to be removably installed in the enclosure and an RVSS circuit mounted on the truck.

3. The apparatus of claim 2, wherein the truck is configured to be rolled into a compartment of the enclosure.

4. The apparatus of claim 3, wherein the truck comprises at least one electrical contact stab configured to engage at least one bus positioned in the enclosure when the truck is racked in the enclosure.

5. The apparatus of claim 2, wherein the rackable truck comprises a first rackable truck, wherein the apparatus comprises a second rackable truck configured to be removably installed in the enclosure, and wherein the bypass contactor is supported by the second truck.

6. The apparatus of claim 5, wherein the first and second rackable trucks are configured to be rolled into at least one compartment of the enclosure.

7. The apparatus of claim 5, wherein the first and second trucks each comprise at least one electrical contact stab configured to electrically connect to at least one bus positioned in the enclosure when the first and second trucks are racked in the enclosure.

8. The apparatus of claim 5, further comprising a third rackable truck configured to be removably installed in the enclosure and including an input contactor configured to selectively couple the power source to the bypass contactor and the RVSS circuit when the first, second and third trucks are racked in the enclosure.

9. A motor starter apparatus comprising:
an enclosure;
a first rackable assembly comprising a bypass contactor and configured to selectively connect a power source to a motor when the first rackable assembly is racked in the enclosure; and
a second rackable assembly comprising an RVSS circuit configured to be coupled to the power source and to apply a variable voltage to the motor when the second rackable assembly is racked in the enclosure.

10. The apparatus of claim 9, wherein a connection of the bypass contactor to the power source and the motor when the first rackable assembly is racked is maintained when the second rackable assembly is removed from the enclosure.

11. The apparatus of claim 9, wherein the first and second rackable assemblies comprise respective first and second wheeled trucks.

12. The apparatus of claim 9, wherein each of the first and second rackable assemblies comprise at least one electrical contact stab configured to electrically connect to at least one bus positioned in the enclosure.

13. The apparatus of claim 9, further comprising a third rackable assembly comprising an input contactor configured to selectively couple the power source to the bypass contactor and the RVSS circuit when the first, second and third rackable assemblies are racked in the enclosure.

14. The apparatus of claim 13, wherein the first, second and third rackable assemblies comprise respective first, second and third wheeled trucks.

15. A method of operating a motor starter apparatus including an enclosure housing a bypass contactor configured to selectively couple a power source to a motor and an RVSS circuit assembly configured to generate and apply a variable voltage to the motor from the power source, the method comprising:
removing the RVSS circuit assembly from the enclosure while preserving connection of the bypass contactor to the power source and the motor; and
providing power to the motor via the bypass contactor.

16. The method of claim 15, wherein removing the RVSS circuit assembly comprises rolling out a wheeled truck from the enclosure.

17. The method of claim 16, wherein the wheeled truck comprises a first wheeled truck and wherein the bypass contactor is included in a second wheeled truck.

\* \* \* \* \*